Sept. 5, 1933.   W. TAMMINGA   1,925,120
PUMPING, AGITATING, AND MEASURING SYSTEM FOR LIQUIDS
Filed Feb. 12, 1932   2 Sheets-Sheet 1
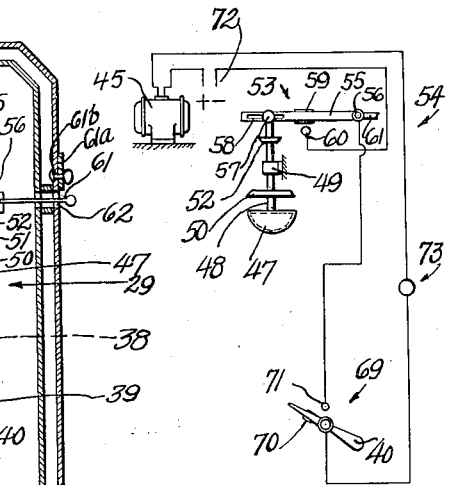
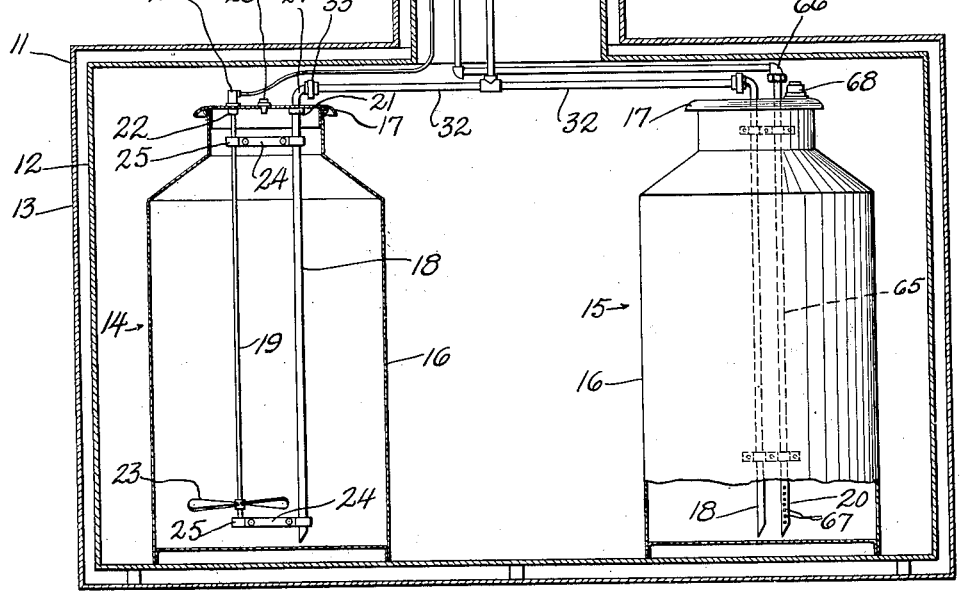
INVENTOR
William Tamminga
BY
Luis Shumacher
ATTORNEY

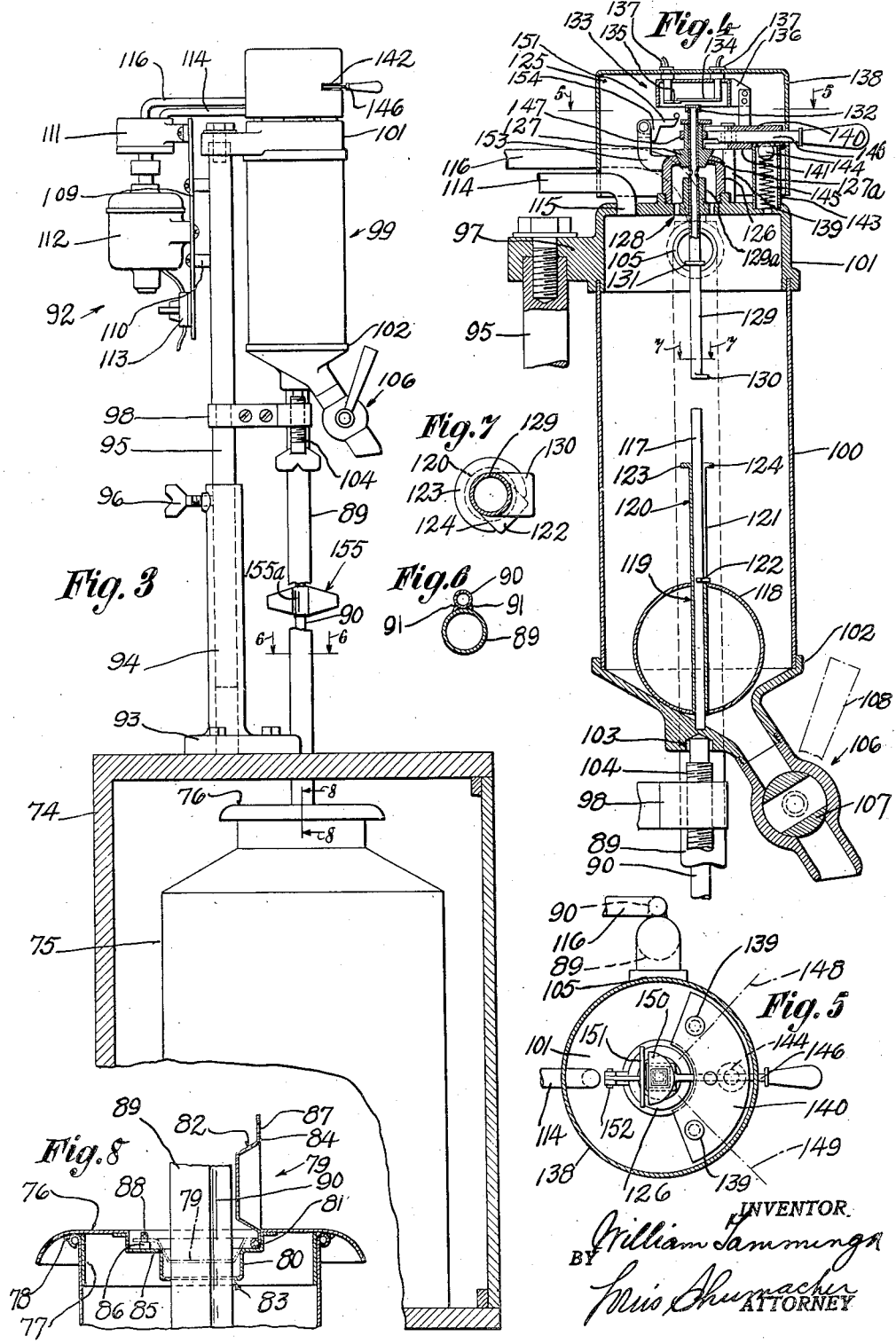

Patented Sept. 5, 1933

1,925,120

UNITED STATES PATENT OFFICE 1,925,120

PUMPING, AGITATING, AND MEASURING SYSTEM FOR LIQUIDS

William Tamminga, New York, N. Y.

Application February 12, 1932. Serial No. 592,494

16 Claims. (Cl. 225—21)

This invention relates to devices for the pumping, agitating and measuring of liquids. While the invention is applicable to any and all kinds of liquids, it is of especial advantage in the handling of milk or other liquid foods and drinks. According to the present practice, milk is generally sold in large cans from which the milk is taken by removing the cover and inserting a suitable measuring cup. This results in contamination of the milk due to the resulting exposure thereof and the measuring cup to outside influences. It is therefore an object of the invention to provide an improved device which shall permit the milk to be handled in a highly sanitary manner, and an improved method in conjunction therewith.

Other objects of the invention are to provide improved means for measuring a quantity of a liquid; improved means for obtaining different measured quantities of a liquid; improved means whereby a liquid may be taken from a container and the flow of liquid automatically terminated when a measured quantity is obtained; improved means whereby the flow of liquid from its container is prevented while the measured quantity of liquid is being discharged; improved means including a pump for obtaining a liquid in such manner that the liquid shall not pass through the pump; improved means including a pump such as an air suction pump for causing a flow of liquid to be measured so arranged that the operation of the pump, or the flow or suction therefrom, or both are terminated when a predetermined quantity of liquid is obtained; improved means whereby the suction created by the pump may be broken; improved means for agitating the liquid in the container therefor; improved means for causing the motor to operate the agitating means without causing a flow of liquid; improved means for preventing the pump, still operating by its momentum, from causing a flow of liquid into the chamber while the drainage of the liquid from the chamber is begun; and a unitary improved means including a liquid container having associated means for the withdrawing and agitating the liquid therein.

Another object of the invention is the provision of a device of the nature set forth having relatively few and simple parts, and which is inexpensive to manufacture and assemble, easy and convenient to operate, durable, reliable and efficient to a high degree in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a view in vertical section with certain parts in elevation, showing a device embodying the invention.

Fig. 2 is a diagrammatic view of parts of the device and showing the electrical circuit.

Fig. 3 is a view in side elevation with parts removed and in section of a modified device embodying the invention.

Fig. 4 is an enlarged vertical sectional view of the measuring and control means.

Fig. 5 is a horizontal sectional view taken on line 5—5 of Fig. 4.

Fig. 6 is a sectional view taken on line 6—6 of Fig. 3.

Fig. 7 is a sectional view taken on line 7—7 of Fig. 4.

Fig. 8 is an enlarged fragmentary sectional view taken on line 8—8 of Fig. 3.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, are submitted merely as showing the preferred exemplification of the invention.

Generally described, this invention provides a container for milk or other liquid, which container and its associated apparatus may be disposed in a refrigerating compartment. This container may have a liquid withdrawing tube and an agitating device therein extending through the cover of the container to be preferably detachably connected to the apparatus, while the cover may be sealed on the container so as to be removed only when the container is to be cleaned or refilled. Communicating with said tube is a liquid measuring chamber which may be suitably arranged to receive a flow of liquid from the container, as by a suction or pressure pump means associated with the system. Thus the chamber may have a capacity of one quart, and the pump may be an air suction pump to cause the flow of liquid into the chamber, the milk container having a vent for atmospheric pressure, if desired. When the liquid in said chamber attains a level corresponding to a predetermined point, such as the upper end of the inlet tube in the chamber, a means responsive to the quantity of liquid therein, as, for instance, a float is actuated and may break the circuit to the motor that operates the pump. Likewise the liquid responsive means may stop communication of the pump and the chamber, or break the suction in the chamber, or both. By providing a plurality of vents, the pump may be operated as for instance to agitate the liquid before any liquid is withdrawn into said chamber. Moreover, as the liquid is withdrawn from the chamber, the operation of the pump is prevented by a vent or by associated releasable locking means. Primarily, however, by keeping a vent open, for instance, manually, the motor though direct connected to the pump, may be operated for actuating an agitating means so that the liquid may be stirred in the container before flow into the measuring chamber occurs. It is desirable that the motor shall not operate while the liquid in the measuring chamber is being drained, and hence, the releasable locking means can be used or a valve outlet control for said chamber may open the motor circuit when the valve is open. To permit different quantities of liquid to be measured in the measuring chamber, adjustable means may be provided or a plurality of tubes of different heights may be disposed therein connected with a multiple way outlet valve control. Agitation of the liquid in the container may also be accomplished by forcing air therethrough from the pump, the air being suitably purified in a novel manner.

Referring in detail to the drawings, 10 denotes a device embodying the invention. The same may include a compartment such as a refrigerator 11 of any suitable type and here shown as having spaced inner and outer walls 12, 13. The refrigerator may have a lower section for receiving one or more suitable containers 14, 15 having milk or other liquid therein. Each of these containers may have a body 16 of large capacity and a cover 17 which is attached thereto in any feasible manner, preferably by sealing. For agitating and withdrawing the liquid from the containers, various means arranged in different ways may be used, but I prefer to employ a tube 18 and an agitator element 19 or 20, which extend into the body 16 through the cover 17. These tubes and elements may be secured to the cover, if desired, so as to form a permanent part thereof. Thus the tube 18 extends close to the bottom of the container and may be fixed to the cover at 21. The element 19 may constitute a shaft journaled in a bearing 22 fixed on the cover. At the lower end of said shaft, there may be provided a stirrer or propeller 23 which may be designed to create a downward suction in the liquid so that the cream that settles at the top of the milk may be thoroughly mixed therewith. For affording additional bearing for the shaft 19, members 24 may be secured to the tube 18, and in which members the shaft may be journaled at 25. The shaft 19 may terminate in a detachable connecting means 26 and the tube 18 may terminate in a suitable connection 27 that may be adapted to take a threaded cap whereby the tube may be sealed for transportation. A suitable air vent 28 may be provided on the cover for manual or automatic operation.

It will thus be seen that the container and its associated parts form a complete unit whereby the liquid may be shipped in a perfectly sanitary manner.

Suitably mounted in an upper section of the refrigerator is a liquid receiving and measuring means 29. The same may include a measuring chamber 30. For communicating this measuring chamber with the containers 14, 15, a tube 31 may be provided having branch lines 32 which may be detachably connected at 33 with the tubes 18. The tube 31 may extend through the bottom of the chamber 30 to a point 34 in proximity to the top thereof.

For draining liquid from the chamber 30, the same may have an outlet 35 in the bottom thereof, which outlet is controlled by a suitable control means such as a valve 36. The latter may have an outlet connection 37 extending out of the refrigerator so as to discharge the liquid at a convenient point where it may be received in a proper receptacle. Assuming that the means 29 is arranged to measure one quart of liquid, if it be desired to measure off or discharge one pint or other smaller predetermined quantity of liquid, a second outlet means such as a tube 38 may be provided whose upper end extends above the bottom of the chamber. The tube 38 may be connected at 39 to the valve 36 which may be a two way valve to communicate with either of the outlets 35, 39. The valve may have a handle 40 and pointer 41 movable along a scale 42 so that as the valve is turned one way or another, the corresponding outlet is opened. In the central position shown in the drawings, both outlets are closed. If the outlet 39 is opened the liquid can be discharged only up to the level of the upper end of the tube 38. Thereupon the chamber may be refilled or the valve may be moved to open outlet 35 to discharge the remaining liquid.

In order to cause a flow of liquid into the chamber 30, a suction pump 43 which may be of the usual rotary type may be employed and may be direct connected by a shaft 44 with an operating means such as an electric motor 45. The pump may have a pipe 46 connected to the inlet thereof and communicating with the chamber 30 to exert suction thereof.

For controlling the action of the pump suction on the chamber 30, a suitable means responsive to the quantity of liquid in the chamber may be used. This means may be of any well known type, and may consist, for example, of a float 47 which may be in the nature of a conventional hollow air sealed or evacuated body. The same may be connected to a stem 48 that may be vertically slidable in a bracket arm 49 which may be secured to the pipe 46. Actuated by said stem are one or more control elements including means for controlling the suction or the motor or both. Thus a valve 50 may be provided for closing the outlet of the chamber at the pipe 46. The latter may have a vent opening 51 adapted to be closed by a valve 52 actuated by said stem. These valves are arranged so that when one of the valves is open the other is closed. For controlling the motor 45 any suitable switch 53 may be provided in the circuit 54. This switch may include an arm 55 pivoted at 56 and having pin and slot connection 57, 58 with the stem 48 for a lost motion engagement. The switch arm may have a contact piece 59 engageable with a contact 60. Hence it will be apparent that when the float is elevated by the liquid in chamber 30, valve 50 closes and valve 52 and switch 53 open, while a reverse action occurs when the float drops. In certain instances, it is desirable to operate the foregoing parts according to a different principle, as in order to introduce a time element in the operation. Hence a manually operative means may be associated with the device, as by affording an extension arm 61 which passes through a slot opening 62 in the refrigerator wall for external manual actuation. The arm 61 may be upwardly moved to any desired degree or intermediate position so that the vent valve 52 may be open while the switch 53 is still closed, whereby the motor may operate the pump without causing suction on the chamber 30, for a purpose hereinafter described. The arm 61 may also serve to partially counterbalance the valves and associated parts about the pivot 56.

In order to operate the agitating device in the container 14, means such as a flexible shaft 63 may be connected to the motor 45 and to the fitting 26. An alternative method of agitating may consist in providing a pipe 64 connected to a pressure region of the pump so as to force air into the container 15 to bubble through the liquid therein. Thus a pipe 65 may be extended through the cover 17 into the container and mounted in the same manner as pipe 18. This pipe 65 may be detachably connected at 66 to the pipe 64 and may have a plurality of holes 67 at its lower end for discharging the air in a stream of bubbles in the liquid, thereby agitating the same. The air may escape through a suitable vent 68 on the cover.

It is desirable that the motor shall not operate, and hence that suction shall not be exerted on the chamber 30 while the liquid therein is being discharged from the chamber. Therefore a suitable switch 69 for the motor 45 may be provided so arranged as to be operative with the valve 36. Accordingly, the valve controller may carry a contact 70 which is adapted to engage a contact 71 when the valve is in closed position, and the switch being opened when the valve is opened either to the right or left. This switch 69 is connected into the circuit 54, to which current may be supplied from any suitable source 72. It will be understood that insulation for the circuit may be supplied wherever necessary and need not be shown herein.

The switch 53 may be retained in closed position, or the arm 61 may be locked in any desired position by a suitable means such as a disc 61a which may be eccentrically mounted at 61b to constitute a cam that is adapted to bear down on the arm 61 according to the angular position of the cam. The said cam may have suitable markings on its face that may be coordinated with other markings on the adjacent part of the casing in a manner that is conventional and hence not shown, for indicating a desired setting of the device. Thus if the device is to be locked in the position shown in Fig. 1, the cam may be rotated to bear down on the cam 61. If the arm 61 is to be dropped to intermediate position, that is with the valves 50 and 52 both open while the contacts 59, 60 are in engagement for causing agitation without pumping the liquid in containers 14 or 15, the cam is rotated correspondingly. Hence every possible condition is provided for.

The manner of operation of the device will now be briefly described. The container 14 being cleaned and filled with liquid, the cover and the members 18, 19 and 28, as a unit, is applied thereto and sealed. The liquid may thus be transported in an absolutely sanitary manner, with the tube 18 capped. Upon placing the container in a refrigerator 11, the connections at 26 and 33, are made and the apparatus is ready for use. Normally the measuring chamber 30, which may be adapted to hold a quart of milk, is always properly filled, so that the milk is available at an instant by opening the valve 36. The chamber 30 is normally filled because when the liquid level therein recedes, the float 47 drops and closes the switch 53 causing the motor 45 to operate so that a suction is created and liquid flows from container 14 through pipe 31 into the chamber. While this is occurring the vent valve 52 is closed and valve 50 is open so that the full effect of the suction is realized. When the liquid level in the container attains the required point, the float 50 is elevated sufficiently to open the switch 53 and the vent valve 52 and to close the valve 50. The suction is thus instantly broken and even if the pump should continue to rotate a little by its own momentum, no additional liquid would be drawn into the chamber. Now if a quart of milk is desired, the valve 36 is operated with its pointer moving toward the left, opening outlet 35 so that the milk flows out at 37. If a pint is desired, the valve is moved in opposite direction to open outlet 39 for tube 38. As the liquid is drained, the float drops and closes the switch 53, but operation of the motor is prevented since the switch 69 is open. As soon as the switch 69 is closed by closing the valve 36, the motor circuit is closed and the chamber 30 refilled. In order to permit agitation of the liquid in container 14, 15 before any liquid is withdrawn therefrom into chamber 30, a switch 73 may be opened, then the arm 61 manually moved to open the vent but without sufficient movement of the arm to open the switch 53. Then the switch 72 may be closed and the motor begins to operate causing agitation without creating a flow of liquid into the chamber. When the element 61 is released, the vent 52 closes and the suction acts fully on the chamber. The switch 72 may be kept normally continually closed.

In Figs. 3 to 8 is shown a modification of the invention including a refrigerator 74, or the like, for a container 75 for liquid such as milk. This container may be of any suitable character, and in a conventional form thereof, may include a main cover 76 having an internal flange 77 for seating in the container neck. This cover may be normally sealed on the container at 78 by means of wax, paraffine or the like, so that the cover cannot be removed without breaking the seal. However, when the container is to be cleaned and refilled, the seal may be broken and thereafter again applied.

For agitating and withdrawing the milk in the container without removal of the cover and contamination of the milk, an auxiliary cover 79 may be provided on the main cover, so arranged as to lie substantially flat thereon in the closing position. One form of construction may include the provision of a recessed portion 80 in the main cover in which the auxiliary cover may lie in the dotted line position. Preferably the auxiliary cover may be pivotally mounted at 81, and may have a conical valve portion 82 for engagement in the recessed portion 80 to close the outlet opening 83 therein. The auxiliary cover may also have a flange 84 to overlie an annular stepped portion 85 of the main cover and to be securely closed by a lug 86 adapted to enter an opening 87 in the auxiliary cover, said lug having an opening in an end thereof for receiving a pin 88 to lock the auxiliary cover down. Suitable packing may of course be associated with the covers for obtaining a liquid tight closure.

When the closure 79 is opened, a means for agitating and withdrawing liquid from the container may be inserted through the opening 83. This means may include a plurality of tubes 89, 90 of different diameters, adapted to extend into proximity to the bottom of the container 74. The tubes may be made up as a unit and soldered at 91 to present smooth surfaces that are easily accessible and readily cleaned. Through the larger tube, milk may be withdrawn under suction, while through the smaller tube air can be injected to stir the liquid in the container, the air escaping through the outlet at 83.

Mounted upon a suitable support, such as the refrigerator 74 is a liquid withdrawing and measuring device 92. For instance, a bracket member 93 may have a tubular hub 94 for slidingly receiving a standard 95 that may be fixed at a desired elevation by a set screw 96. A bracket arm 97 may be connected to the upper end of the standard, and a second bracket arm 98 at a lower point thereof, said brackets being arranged to carry any liquid measuring chamber 99. The latter may consist of a cylinder 100 and upper and lower caps 101, 102 may be provided for closing the same in a suitable manner. Preferably the upper cap may be formed integral with the arm 97, while the lower cap may be provided with a central recess 103 for receiving the end of a pressure bolt 104 threaded through the arm 98, so that the caps 101, 102 may be tightly pressed on the cylinder, and yet be removable therefrom for cleaning the chamber 99.

At the upper end of the chamber a liquid inlet 105 may be provided, preferably in a wall of the cap 101, and the tube 89 may be removably connected to said inlet in any suitable manner. At the lower end of the chamber, the cap 102 may be provided with an outlet means 106 controlled by any suitable valve 107 that may be manipulated by a handle 108. As indicated in the drawings, said outlet is preferably taken as near as possible to the axis of the chamber so that the valve will not laterally project therefrom.

A power and pump unit may be mounted on the standard, as by means of a plate 109 connected thereto by spacers 110, and a pump 111 of any suitable type being fixed to said plate. Preferably this pump is of a positive pressure type and may be direct connected to a motor 112 controlled by an electrical switch 113 all mounted on said plate.

A tube 114 may connect the pump inlet with the upper part of the chamber 99, as at 115. A second tube 116, preferably of flexible nature, may be detachably connected in any suitable manner to the tube 90 so as to communicate the same with the pump outlet.

Fixed in the chamber 99 is a guide such as rod 117 that may be central with the chamber. A device responsive to a head of liquid may be provided, such as a float 118 through which may extend a tube 119 slidable along the rod. The tube 119 may include a projecting actuator portion 120, having a longitudinal slot 121 for slidingly receiving a lug or pin 122 projecting from the rod. At its upper end the tube may have a flange portion 123 through which the slot extends at 124.

Mounted on the upper head 101 is a flow controlling means 125. The same may include a casing 126 connected to said head in an air tight manner. This casing may have an opening 127a in an upper wall thereof, providing a seat for a valve 127, while the interior of said casing may communicate with the chamber 99 through openings 128. Connected to said valve is a light, hollow rod 129 which may be slidable through a hub 129a on the head, and disposed in substantial alinement with the guide 117. The rod 129 may have one or more laterally projecting fingers 130, 131 vertically and angularly spaced from each other, say at an angle of 90 degrees. The rod 129 is movable through a corresponding angle, so that in one position thereof the lower finger 130 abuts the flange 123 when the float 118 raises the same, and in another position, the finger 130 is movable through slots 121, 124 so that the flange will abut only the other finger 131, while the lower portion of the rod 129 is received in the element 120.

Preferably, the rod 129 may extend through and above the valve 127 and be capped at 132. The upper end of the member 129 may be arranged to open a switch 133 for the motor 112, as by moving upward to deflect the spring conductor 134 out of engagement with the contact 135. The switch may be suitably mounted as at 136 and may have binding posts such as 137 projecting removably or otherwise through a cover 138 that encloses the control mechanism 125. The binding posts may be connected to the motor or switch 113 in a well known manner, the switch 113 being normally closed, while the switch 133 directly controls the normal operation of the motor.

Mounted on the head 101 are a plurality of standards 139 that may carry a guide means such as a plurality of segmental plates 140, 141 in spaced parallel relation to each other, the space between said plates being in communication with a slot 142 of corresponding length in the cover 138. Interconnecting the head 101 and the lower plate 141 is a tubular casing 143 which communicates with said chamber 99 and has an upper opening extending through the plate 141. Within said casing 143 is a ball valve 144 adapted to close the upper opening of said casing, said opening being of sufficient size so that said valve may slightly project above the plate 141. Actuating the ball valve into valve closing position is an expansion coil spring 145.

Slidingly disposed between the plates 140, 141 is an oscillatory lever 146 having a hub 147 provided with a square opening for slidingly nonrotatably receiving a hub of the valve 127. The lever 146 extends outward through the slot 142 and is movable between standards 139 through an angle of 90 degrees as indicated by dotted lines 148, 149, causing a corresponding angular movement of the parts 129, 130, 131. Since the ball valve 144 is located intermediately of the positions 148, 149, the lever when thus positioned as shown in Fig. 5, will depress the ball valve into open position so as to afford a vent into the chamber 99.

In order to retain the valve 127 elevated in open position when the lever 146 is at a position at 14 or 149, the member 129 may carry a semicircular plate 150 that turns therewith. This plate may coact with a releasable locking means, such as a T shaped member 151 that is pivotally mounted at 152 on an arm 153 secured to the casing 126, and having stop engagement with said arm at 154 so as to limit the downward movement thereof under the action of gravity. The plate 150 is in proximity to said member 151 and normally disposed thereunder so that when the plate is turned and then raised by the member 129, it will raise the member 151 until the latter disengages it and drop back to initial position. If now the member 129 should begin to move lower, the plate 150 would engage and rest on top of the member 151 thereby keeping the valve 127 and switch 133 open, or permitting the switch to close if the member 129 drops sufficiently and depending upon the proximity of the switch to the member 129.

In order that any air injected into the container 75 shall be purified, the tube 90 may have a casing 155 of any suitable form therein and partially recessed at 155a to receive the tube 89. Said casing may be provided with a filter or the like, said filter being impregnated, for example, with a suitable chlorine compound. Since the pump 111 abstracts from the moisture laden chamber 99 the air discharged into the container 75, the moisture will serve to act with the chlorine to liberate nascent oxygen and destroy any bacteria present in the air. Suitable filters may also be provided at inlets to the chamber 99, if desired.

The operation of the device will now be briefly described. With the device in the position shown in the drawings, the switch 133 is closed so that the motor 112 may be operated on closing the switch 113. Also the vent 127 is closed while the ball valve vent 144 is held open by the lever 146. Consequently, the pump 111 operated by the motor and drawing air from the chamber 99 cannot create a suction in said chamber, due to the inflow of air at 144; at any rate insufficient suction is created to cause a flow of liquid into chamber 99. The pump 111, however, discharges its air through tube 90 into the lower portion of the container 75 to agitate the liquid therein. Hence the milk may be agitated before being withdrawn from the container. If now it is desired to obtain a measure, say of one pint of milk, the lever 146 may be swung to the right to position at 148 releasing valve 144 which thereupon closes. The lever also turns the member 129 through an angle of say 45 degrees. Since both vents are now closed, the suction in the chamber increases and causes the milk from container 75 to flow through tube 89 into said chamber. The float 118 begins to rise moving the member 120 upward until flange 123 strikes the lower finger 130 and elevates the member 129, opening valve 127 and switch 133. Thereupon the motor stops, since the pump acts as a brake thereon, and the valve 107 is opened to drain the milk. The plate 150, however, seats on the member 151 preventing the suction from being renewed while the liquid is being drained. The lever 146 is now returned to its central position and the milk in container 75 again agitated. If now one quart, for instance, of milk is desired, the lever 146 is swung toward the left whereupon, both vent valves 127, 144 being closed, the incoming liquid lifts float 118, the finger 130 being movable along slots 124, 121 until the flange 123 strikes the upper finger 131, elevating member 129 and causing a repetition of the operation above described.

It will be noted that the device is easy to clean, and that the almost constant low pressure and temperature in the chamber 100 will militate against the growth of bacteria therein. Moreover, the agitating air will be purified at 155 as described.

It will be appreciated that various changes and modifications may be made in the device as shown in the drawings, and that the same are submitted in an illustrative and not in a limiting sense, the scope of the invention being defined in the following claims.

I claim:

1. A device including a chamber, means including a pump for creating a suction in the chamber to cause a flow of liquid thereinto, control means responsive to the head of liquid in the chamber, a vent for the chamber, said vent being operative by the control means, the suction creating means being rendered inoperative by the control means simultaneously with the opening of the vent, and a second vent for the chamber, the control means being movable into inoperative position and being adapted to open the second vent in said inoperative position.

2. A device having liquid receiving means including a measuring chamber for liquids, means including an air suction pump communicating with said chamber for causing a flow of liquid thereinto, means responsive to the quantity of liquid in the chamber for breaking the suction, and manual means for independently causing operation of the responsive means.

3. A device including a measuring chamber for liquids, a pump for causing a flow of liquid into the chamber, means for operating the pump, and a unitary means responsive to the quantity of liquid in the chamber for rendering the operating means inoperative and for preventing the pump from causing a flow of the liquid into the chamber regardless of the operation of the pump, said unitary means being adapted to automatically render the operating means operative and to cause the pump to cause a flow of liquid into said chamber.

4. A device including a measuring chamber for liquid, an air suction pump communicating with the chamber for causing a flow of a liquid thereinto, means for operating the pump, and means responsive to the liquid level in the chamber including means for controlling the pump operating means and means for venting the pump so as to break the suction.

5. A device including means for receiving and measuring a liquid, outlet control means therefor, and means coacting with the aforementioned means so that the first mentioned means is operative and inoperative when the outlet control means is in closed and opening positions respectively.

6. A device including means for receiving and measuring a liquid, outlet control means therefor having a plurality of open positions, means coacting with said outlet control means and the first mentioned means whereby different measured quantities of liquid can be withdrawn, and operating means for the first mentioned means, said operating means being controlled by said outlet control means so as to be operative in the closed position of the outlet control means and inoperative in either of the open positions thereof.

7. A device having a source of liquid, a measuring means including a chamber for receiving a liquid to be measured, means including an air pump for causing a flow of liquid from said liquid source to said chamber, and means whereby the air pump discharges air into the liquid source for agitating the liquid therein.

8. A device including means for receiving and measuring a liquid, an outlet control for the liquid in said means, means responsive to the quantity of liquid in said means for rendering the latter inoperative to receive liquid, and means controlled by said outlet control for maintaining the receiving and measuring means inoperative while the outlet control is in position to cause discharge of liquid from said means.

9. A device including a liquid container having a main cover removably connected thereto, said main cover having a recessed outlet portion, an auxiliary cover mounted on the main cover for closing the outlet and seating in said recessed portion, means for measuring a liquid, a tube connected to said measuring means and removably extending into the container through said outlet on opening the auxiliary cover, agitating means for liquid in the container associated with the tube, and means for causing a liquid to flow by suction from the container through said tube into the measuring means and to cause operation of the agitating means.

10. A device including a chamber for measuring a liquid, an air suction pump communicating with the chamber for causing a flow of liquid thereinto, means for operating the pump, a valve for shutting off the chamber from communication with the pump, a vent between said valve and pump, a valve for said vent, said valves being arranged so that one of said valves is open when the other is closed, and means responsive to the quantity of liquid in the chamber for operating said valves.

11. A device including a measuring chamber, a plurality of tubes extending through the bottom thereof to different elevations in the chamber, the tube that extends to the point of highest elevation being adapted to communicate with a source of liquid, a suction means communicating with the chamber at the top thereof, a plurality of outlets for the chamber including one outlet communicating with another of said tubes and one outlet communicating with the bottom of the chamber, and valve means for opening either of said outlets.

12. A device including a chamber, means to cause a flow of liquid into the chamber, means responsive to a head of liquid in the chamber for rendering the flow causing means inoperative, and means releasably coacting with said responsive means for maintaining the flow causing means inoperative, whereby a flow of liquid into the chamber is prevented while the liquid is being drained therefrom.

13. A device including a liquid container, means for receiving and measuring a liquid from said container, and agitating means for the liquid in the container, said agitating means being operated by the first mentioned means.

14. A device including a chamber, means for causing a flow of liquid thereinto, means responsive to the head of liquid in the chamber for controlling the flow causing means, the controlling means including a vertically movable means in the chamber, associated means extending in the general direction of the movable means therewith and having angularly spaced portions at different elevations individually engageable by the vertically movable means, and means for causing a relative rotation between the vertically movable means and the associated means to cause actuation of the latter at different elevations and a corresponding control of the flow causing means.

15. A device including a source of liquid, means for receiving and measuring a liquid from said source including means for causing a flow of the liquid from the source, means for agitating the liquid in said source, means for causing the agitating means to be operated in coaction with the flow causing means, and means to prevent the flow causing means from operating except to cause operation of the agitating means.

16. A method of agitating milk and withdrawing quantities of the milk into a measuring chamber including causing a flow of air through said chamber to abstract moisture, subsequently causing chlorination of the air with the aid of said moisture, and finally injecting the air into the milk for agitating the same.

WILLIAM TAMMINGA.